July 23, 1935.  R. R. NYDEGGER  2,008,873
POWER TRANSMITTING DEVICE
Filed April 10, 1930  3 Sheets-Sheet 1

INVENTOR
R. R. NYDEGGER
BY
E. R. Nowlan
ATTORNEY

July 23, 1935.  R. R. NYDEGGER  2,008,873
POWER TRANSMITTING DEVICE
Filed April 10, 1930   3 Sheets-Sheet 2
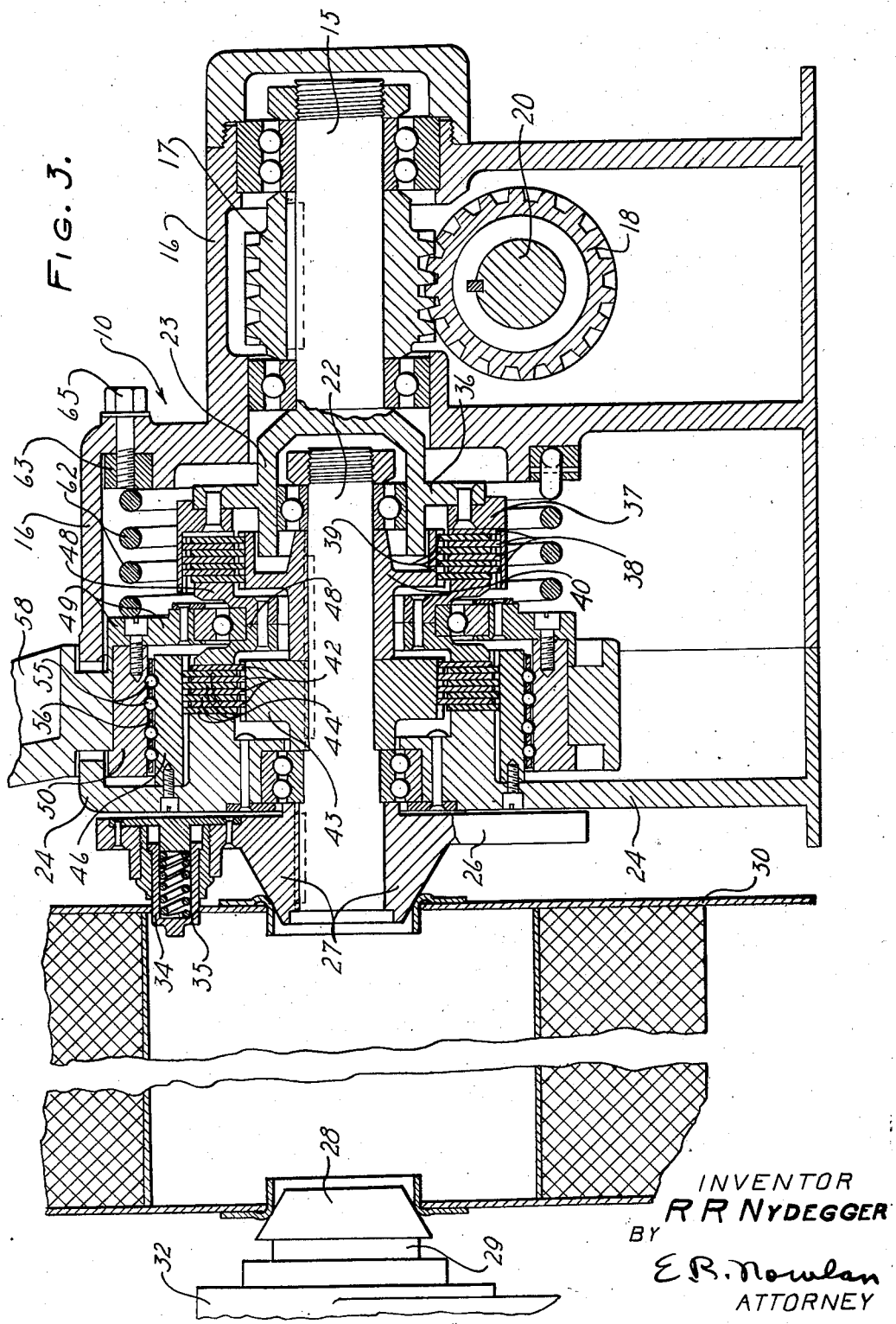
INVENTOR
R R NYDEGGER
BY
E. R. Nowlan
ATTORNEY

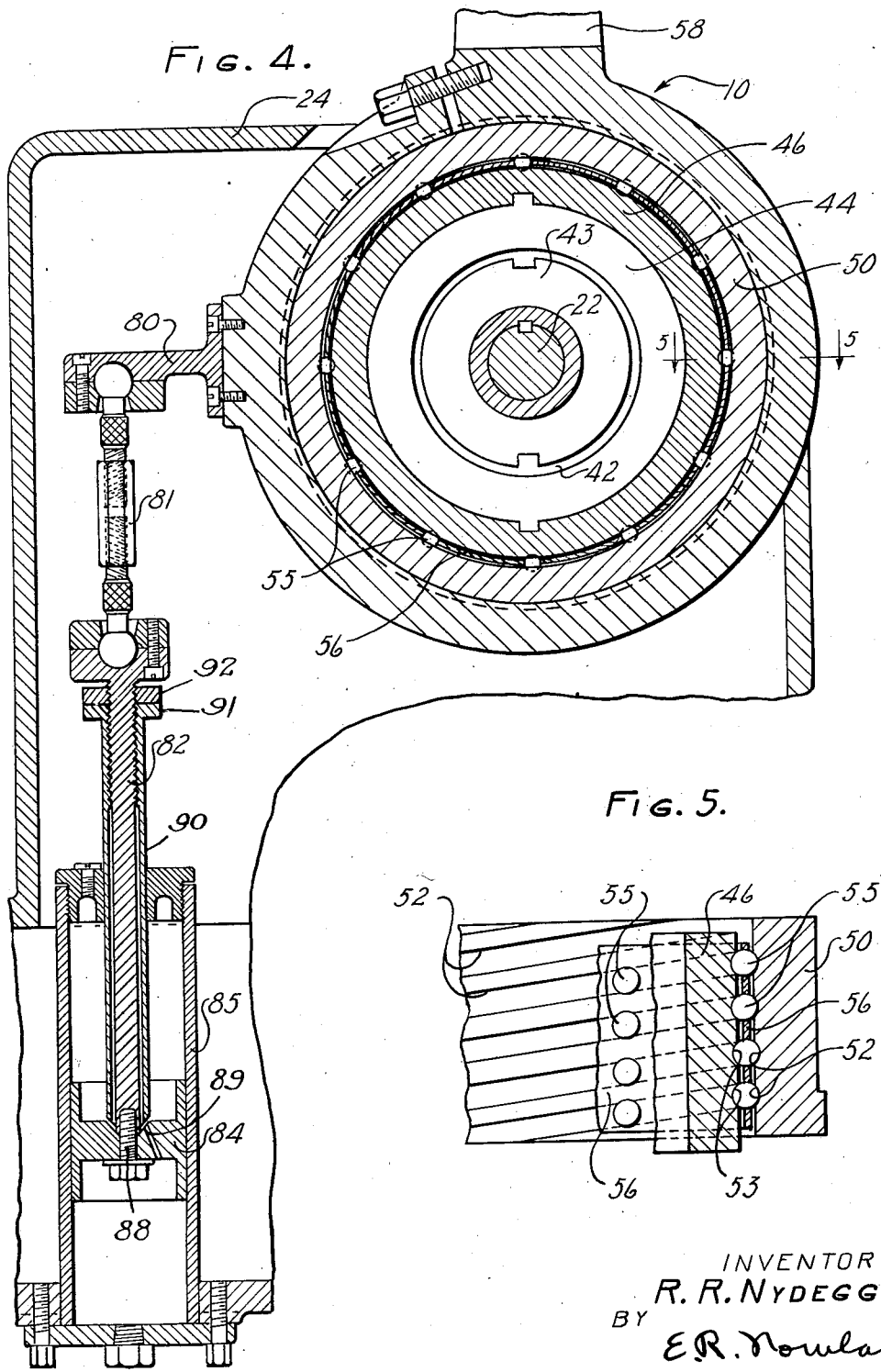

Patented July 23, 1935

2,008,873

UNITED STATES PATENT OFFICE 2,008,873

POWER TRANSMITTING DEVICE

Roland R. Nydegger, Westfield, N. J., assignor to Western Electric Company, Incorporated, New York, N. Y., a corporation of New York Application April 10, 1930, Serial No. 443,017

9 Claims. (Cl. 192—18)

This invention relates to power transmitting devices, and more particularly to power transmitting devices for machines for rewinding strands or other flexible material from one reel to another.

An object of the invention is to provide a simple and efficient machine whereby flexible material may be wound at substantially constant high speeds and under constant low tensions.

One embodiment of the invention contemplates the provision of a machine comprising an improved power transmitting mechanism for rewinding wire or other strands and particularly small gage wire at low tension, for example, from one reel to another, for the purpose of splicing together short lengths of strands from numerous reels to make up full reels or in order to repair defects in the strands. The machine consists of a supply unit and a take-up unit driven from a common source of power through multiple disc friction clutches and provided with multiple disc friction brakes. The strand being rewound passes over pivoted tension arms which differentially control, through a screw thread ball bearing camming action, the supply and take-up friction brakes and driving clutches to insure a substantially constant tension and uniform linear speed of the strand.

It is believed that a complete understanding of the invention will be had from the following detailed description when read in conjunction with the accompanying drawings, wherein Fig. 1 is a plan view, partly in section, of a machine embodying the features of the invention;

Fig. 3 is an enlarged fragmentary vertical section on line 3—3 of Fig. 1;

Fig. 4 is an enlarged fragmentary vertical section on line 4—4 of Fig. 1, and

Fig. 5 is an enlarged fragmentary detail section on line 5—5 of Fig. 4.

Figure 1:
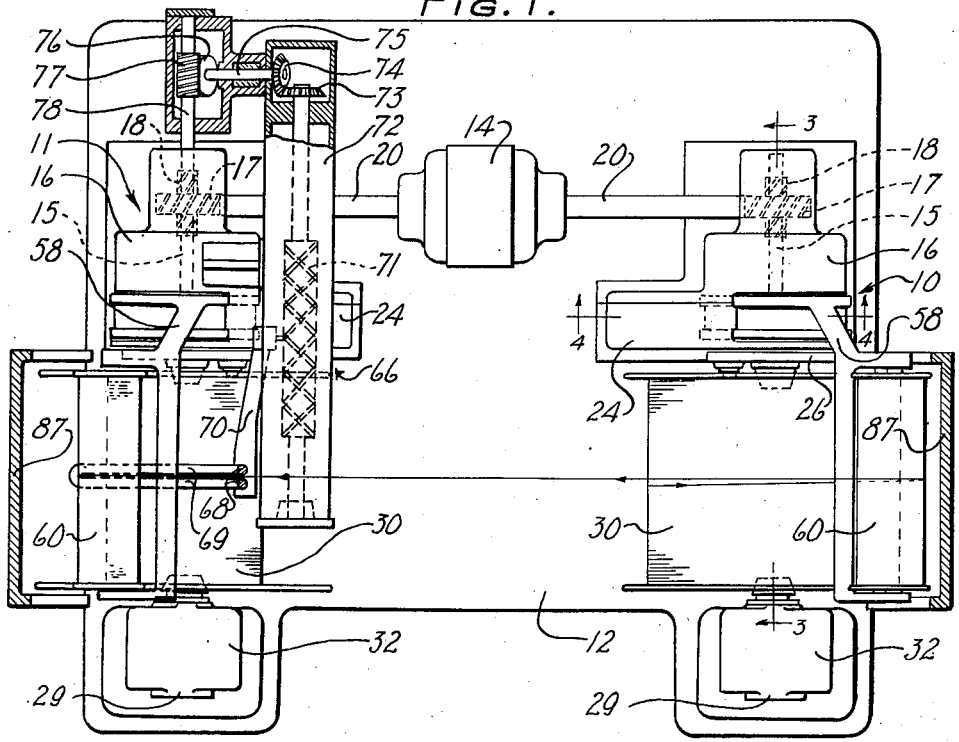

Referring now to the drawings wherein like reference numerals designate corresponding parts in the several views, it will be observed that the present embodiment of the invention comprises a supply unit 10 and a take-up unit 11, both units being supported upon a common bench or pedestal 12 and driven from a common electric motor 14. Since the construction and operation of the two units are identical, it is believed that a detailed description of one of them will be sufficient to a complete understanding of the invention.

The supply and take-up units 10 and 11 each consists of a horizontal shaft 15 rotatably journalled in a housing 16 (Fig. 3) secured to the supporting pedestal 12. The shafts 15 are driven through spiral gears 17 and 18 from a common drive shaft 20 extending from and driven by the motor 14. Disposed in axial alignment with the shaft 15 is a spindle 22, the inner end of which is rotatably journalled in an enlarged hub portion 23 formed on the inner end of the shaft 15. The spindle is suitably journalled near its outer end in a housing 24 secured to the pedestal 12 adjacent to the housing 16 and cooperating therewith to provide a complete enclosure for the spindle driving and braking mechanisms hereinafter described.

A circular plate 26 is secured to the outer end of the spindle 22 so as to be rotatable therewith and is formed with a central frusto-conical portion 27 (Fig. 3) adapted to cooperate with a frusto-conical portion 28 of a spring pressed arbor 29 to accurately center and support a reel 30, the arbor 29 being rotatably journalled in a bracket 32 secured to the pedestal 12. A spring pressed pin 34 mounted in the circular plate 26 is adapted to engage an aperture 35 in a head of the reel whereby the reel is rotatable with the spindle 22.

The shaft 15 is formed with an external annular flange 36 to which is secured a bushing or sleeve 37 having a plurality of spaced annular friction discs 38, 38 slidably keyed therein. The discs 38 are adapted to engage and drive a plurality of spaced annular discs 39, 39 slidably keyed to a hub 40 keyed to the spindle 22. The construction just described constitutes a multiple-disc friction clutch through which the spindle 22 is adapted to be driven from the shaft 15.

A plurality of spaced annular discs 42 are slidably keyed to a hub 43 secured to the spindle 22 and are arranged to engage a plurality of cooperating annular discs 44 slidably keyed to a stationary cylindrical member 46 attached to the housing 24. This construction constitutes a variable multiple-disc friction brake for retarding or stopping the rotation of the spindle 22.

Interposed between the friction driving clutch and the friction brake just described is a thrust collar 48 which is constructed and arranged so as to apply pressure at all times either upon the driving friction discs or the braking friction discs. The thrust collar 48 is rotatably journalled in an annular plate 49 which is attached to a sleeve 50 adapted to rotate around the stationary cylindrical member 46. The sleeve 50 is formed with internal left hand threads or spiral grooves 52

Figure 2:
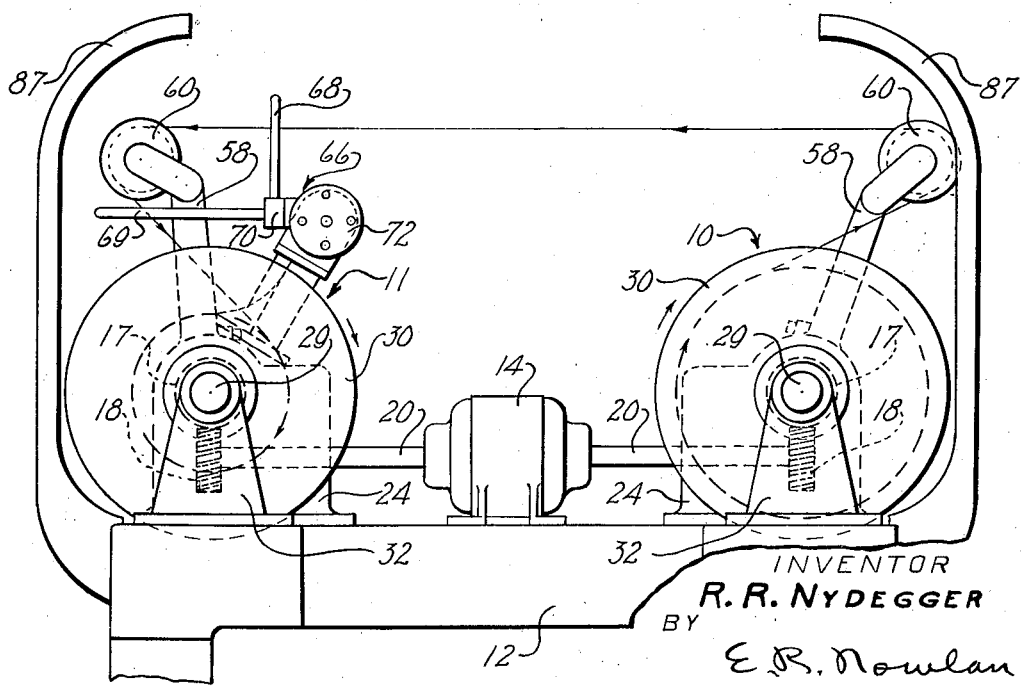
Fig. 2 is a fragmentary front elevational view of the machine shown in Fig. 1.

(Fig. 5) which cooperate with corresponding external spiral grooves 53 formed in the cylindrical member 46, to accommodate a plurality of spaced ball bearings 55 carried by a retaining sleeve 56 interposed between the sleeve 50 and cylindrical member 46. The construction just described is such that the rotation of the sleeve 50 in a clockwise direction (Figs. 2 and 4) is transmitted through the camming action of the ball bearings 55 in the left hand spiral grooves of the sleeve 50 and the stationary cylindrical member 46, to produce a corresponding axial movement of the sleeve and thereby the thrust collar 48 toward the left, (Fig. 3), whereby the pressure on the braking discs is increased and the pressure on the driving discs is simultaneously decreased. In a similar manner, the rotation of the sleeve 50 in a counter-clockwise direction produces a corresponding axial movement of the thrust collar 48 toward the right (Fig. 3) whereby the driving pressure is increased and the braking pressure is simultaneously decreased.

An operating member or tension arm 58 is clamped at one end to the internally threaded sleeve 50 so as to be rotatable therewith, and carries a roller 60 upon its free end over which the strand is passed as it is withdrawn from the supply reel and before it is wound upon the take-up reel.

Enclosed within the housing 16 is a torsional spring 62 (Fig. 3) which is attached at one end to the annular plate 49 and secured at its opposite end to an annular plate 63 adjustably secured to the housing 16. In the supply unit 10, the torsional spring 62 is designed and arranged so that it tends to rotate the sleeve 50 and thereby the tension arm 58 in a clockwise direction (Figs. 2 and 4), thus tending to apply pressure to the braking discs 42 and 44 and relieve the pressure on the driving discs 38 and 39. In the take-up unit 11, the torsional spring 62 is designed and arranged so that it tends to rotate the sleeve 50 and thereby the tension arm 58 in a counter-clockwise direction (Figs. 2 and 4) thus tending to apply pressure to the driving discs and relieve the pressure on the braking discs. By loosening one or more screws 65 (Fig. 3) the annular plate 63 may be turned either in a clockwise or in a counter-clockwise direction to thereby vary the tension of the torsional spring 62.

The take-up unit 11 is provided with a distributing mechanism 66 (Figs. 1 and 2) for applying the strand upon the take-up reel in smooth uniform layers. This mechanism consists of a plurality of spaced guide fingers 68 and 69 extending from a slide 70 which is reciprocated in a well known manner through the rotation of a reversible screw 71 (Fig. 1) journalled in a cylindrical housing 72 and driven through bevel gears 73 and 74 from a shaft 75 which, in turn, is driven by a worm gear 76 and a worm 77, the latter being keyed to an extended portion 78 of the take-up reel driving shaft 15.

Secured to and extending from the tension arm 58 is an arm 80 (Fig. 4) which is pivotally connected by means of an adjustable link 81 to the upper end of a vertical piston rod 82. A piston 84 secured to the lower end of the piston rod is slidable in a cylinder 85 containing a suitable fluid, preferably oil. The lower end of the piston rod 82 is conical and fits into a corresponding conical depression in the piston. The piston rod is attached to the piston by means of a screw 88. An oil passage 89 leads from the lower face of the piston to the conical depression. A sleeve 90, threaded internally near its upper end is fitted over the piston rod and engages a thread thereon, the upper end of the sleeve having an integral adjusting collar 91, the lower end of the sleeve being conically tapered to seat in the depression in the piston and being proportioned to cover the upper outlet of the passage 89. By adjusting the sleeve on the rod, the sleeve can be made to admit oil with more or less resistance through the passageway as the piston moves up or down thus giving an adjustable dash-pot effect. A lock nut 92 may be provided to hold the sleeve in its adjusted position.

The supply and take-up units are provided with guard plates 87 which are attached to and extend upwardly from the pedestal and serve to prevent injury to the operator due to breakages in the strand being rewound.

In the operation of the above described rewinding machine, a reel 30 containing a supply of wire or other strand material to be rewound is mounted in the supply unit 10, as shown in Fig. 3, and an empty reel is similarly mounted in the take-up unit 11. The end of the strand from the supply reel is threaded over the rollers 60 of the tension arms 58 and between the distributor fingers 68 and 69, and is then attached to the take-up reel. Full pressure is now applied on the take-up driving clutch and the supply brake, while the pressures on the take-up brake and the supply driving clutch are relieved, due to the action of the torsional springs 62, as hereinbefore described. Consequently, upon starting the driving motor 14 to start the rewinding operation, the take-up driving clutch tends to rotate the take-up reel at the same speed as the motor, but since the pressure on the supply brake is fully applied the tension in the strand builds up and draws the two tension arms 58 towards each other against the action of their respective springs 62. This motion of the tension arms is transmitted through the screw threaded ball bearing camming action above described to reduce the pressure on the take-up driving clutch and transfer the pressure from the supply brake to the supply driving clutch. As both the supply and take-up reels are now being driven they will accelerate together until the take-up reel is driven at the same speed as the motor.

As the force required to drive the take-up reel is obviously dependent upon the moment arm, or in other words, upon the radius of application of the strand on the reel, and since the torsional spring 62 of the take-up unit is adjusted so that the take-up driving clutch will just drive the empty take-up reel at the motor speed, it will be obvious that the speed of the take-up reel is gradually reduced as the strand builds up on it due to the gradually increasing length of the moment arm. Thus, the linear speed of the strand is maintained substantially constant as the strand builds up on the take-up reel. The linear speed of the strand is further stabilized by the gradual acceleration of the supply reel due to the gradual decreasing length of the moment arm as the strand is withdrawn therefrom. In other words, the driving arrangement just described is such that the supply reel is driven differentially with respect to the take-up reel, whereby the strand is rewound at a substantially constant linear speed and under a constant tension. Since the drive and tension controlling mechanisms of the present invention operate efficiently even when an extremely low tension is maintained in the strand being rewound, the machine of the present invention may be employed to particular advantage for rewinding the smaller gage wires which much be maintained under low tensions in order to prevent breakages.

It is to be understood that the embodiment of the invention herein illustrated and described represents only one useful application of the invention which is capable of modifications and other numerous applications within the scope of the appended claims.

What is claimed is:

1. In a power transmitting device, a driving member, a driven member, a clutch mechanism frictionally connecting the driving member to the driven member, a stationary member, a braking mechanism frictionally connecting the driven member to the stationary member, a thrust collar interposed between the said clutch and braking mechanisms and engageable therewith, a member journalled upon the thrust collar and having a sleeve portion provided with an internal spiral groove, said stationary member having a portion provided with a corresponding external spiral groove, a plurality of anti-friction balls interposed between the sleeve and the externally grooved portion of the stationary member and disposed within the grooves, and an arm carried by the member which is journalled upon the thrust collar, for rotating the sleeve portion upon the balls and thereby axially displacing the thrust collar to oppositely vary the effectiveness of the clutch mechanism and the braking mechanism.

2. In a power transmitting device, a pair of spindles, a driven member associated with one of the spindles, a second driven member associated with the other spindle, means to couple and uncouple each driven member to and from its associated spindle, power means to drive the spindles, a friction clutch mounted to couple each spindle to the power means, a friction brake to control the rotation of each spindle, means to simultaneously and gradually engage the clutch associated with the first mentioned spindle and the brake associated with the second mentioned spindle while disengaging the brake associated with the first mentioned spindle and the clutch associated with the second mentioned spindle and vice versa, comprising a thrust collar between said brake and clutch, a stationary cylindrical member having external spiral grooves therein, and a sleeve rotatable with respect to the stationary cylindrical member and the thrust collar and having internal spiral grooves therein cooperating with the external spiral grooves of the stationary cylindrical member, and a plurality of spheres in said grooves to produce a camming action on said thrust collar when said sleeve is rotated, and adjustable means tending to rotate said sleeve in one direction.

3. In a power transmitting device, a pair of shafts having a hub portion at one end, a pair of spindles, said spindles journalled at one end in the hub portions of said shafts, a driven member associated with one of the spindles, a second driven member associated with the other spindle, means to couple and uncouple each driven member to and from its associated spindle, power means to drive the shafts, a friction clutch mounted to couple each spindle to the shafts, a brake to control the rotation of each spindle, and means to simultaneously and gradually engage the clutch associated with the first mentioned driven member and the brake associated with the second mentioned driven member while disengaging the brake associated with the first mentioned driven member and the clutch associated with the second mentioned driven member and vice versa, said last mentioned means comprising a thrust collar mounted concentric with and over each spindle and interposed between the friction clutch and the brake, an annular plate located concentric with and over each spindle and rotatable with respect to the thrust collar, and cam means to move said annular plates along the axis of said spindles.

4. In a power transmitting device, a shaft having a hub portion at one end, a spindle journalled at one end in a hub portion of said shaft, a driven member associated with the spindle, power means to drive the shaft, means to couple and uncouple the driven member from the spindle, a friction clutch to couple the spindle to the shaft, a brake to control the rotation of the spindle, and means to gradually and simultaneously engage the clutch while disengaging the brake and vice versa, comprising a thrust collar concentric with and over the spindle and interposed between the clutch and brake, an annular plate concentric with and over the spindle and rotatable with respect to the thrust collar, and cam means to move the annular plate along the axis of the spindle.

5. In a power transmitting device, a spindle, power means to drive the spindle, a friction clutch to couple the spindle to the power means, a brake to control the rotation of the spindle, and means to gradually and simultaneously engage the clutch while disengaging the brake and vice versa, comprising a thrust collar between the brake and clutch, a cylindrical member having external spiral grooves therein, a sleeve rotatable with respect to the cylindrical member and the thrust collar and having internal spiral grooves therein cooperating with the external spiral grooves of the cylindrical member, a plurality of spheres in said grooves to produce a camming action on said thrust collar when said sleeve is rotated with respect to said cylindrical member, and means tending to rotate said sleeve in one direction.

6. In a power transmitting device, a driving member, a driven member, a clutch mechanism frictionally connecting the driven member to the driving member, a stationary member, a braking mechanism frictionally connecting the driven member to the stationary member, a thrust collar interposed between the clutch and braking mechanisms and engageable therewith, a sleeve journalled on the thrust collar, means to engage the sleeve and the stationary member for relative screw-thread motion, and an operating member carried by the sleeve for rotating the sleeve and thereby axially displacing the collar to oppositely vary the effectiveness of the clutch mechanism and the braking mechanism.

7. In a power transmitting device, a driving member, a driven member, a clutch mechanism frictionally connecting the driven member to the driving member, a stationary member, a braking mechanism frictionally connecting the driven member to the stationary member, a thrust collar interposed between the said clutch and brake mechanisms and engageable therewith, an annular plate journalled upon the thrust collar, a sleeve secured to the annular plate, means to engage the sleeve and the stationary member for relative screw-thread motion, means associated with the sleeve for rotating the sleeve and thereby axially displacing the thrust collar to oppositely vary the effectiveness of the clutch mechanism and the brake mechanism, and resilient means normally tending to produce frictional engagement in the brake mechanism.

8. In a power transmitting device, a driving member, a driven member, a thrust collar, a clutch mechanism associated with said thrust collar and interposed between the driven and driving members to establish driving connection therebetween upon axial displacement of the thrust collar in one direction, a stationary member, a braking mechanism interposed between the driven member and the stationary member to retard the driven member upon axial displacement of the thrust collar in the other direction, a sleeve associated with the thrust collar, means to engage the sleeve and the stationary member for relative screw thread motion for axially displacing the thrust collar, means for rotating the sleeve, a rotationally adjustable plate, and a helical spring having one end engaging the sleeve and the other end engaging the rotationally adjustable plate for normally tending to produce operative engagement in said brake mechanism.

9. In a power transmitting device, a driving member, a driven member, a clutch mechanism operable to connect the driven member to the driving member, a stationary member, a braking mechanism operable to connect the driven member to the stationary member, a thrust collar interposed between the said clutch and braking mechanisms and engageable therewith, a plate journalled on the thrust collar, a sleeve attached to the plate, means to engage the sleeve and the stationary member for relative screw thread motion, means for rotating the sleeve to oppositely vary the effectiveness of the clutch and braking mechanisms, and a dashpot associated with the sleeve to prevent abrupt rotation thereof.

ROLAND R. NYDEGGER.